(12) United States Patent
Wang

(10) Patent No.: US 10,105,679 B2
(45) Date of Patent: Oct. 23, 2018

(54) CO-AGGLOMERATED COMPOSITE MATERIALS

(71) Applicant: IMERYS FILTRATION MINERALS, INC., San Jose, CA (US)

(72) Inventor: Bo Wang, Union City, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 3 days.

(21) Appl. No.: 15/695,970

(22) Filed: Sep. 5, 2017

(65) Prior Publication Data

US 2017/0361303 A1   Dec. 21, 2017

Related U.S. Application Data

(63) Continuation of application No. 14/408,786, filed as application No. PCT/US2013/047259 on Jun. 24, 2013, now abandoned.

(Continued)

(51) Int. Cl.
*B01D 24/00* (2006.01)
*B01D 39/00* (2006.01)
(Continued)

(52) U.S. Cl.
CPC ............... *B01J 20/14* (2013.01); *B01J 20/10* (2013.01); *B01J 20/103* (2013.01); *B01J 20/106* (2013.01);
(Continued)

(58) Field of Classification Search
CPC .. B01J 20/2803; B01J 20/28016; B01J 20/14; B01J 20/10; B01J 20/103;
(Continued)

(56) References Cited

U.S. PATENT DOCUMENTS 5,776,353 A   7/1998   Palm et al.
6,524,489 B1  2/2003   Palm et al.
(Continued)

FOREIGN PATENT DOCUMENTS

JP   H0747266 A    2/1995
JP      3331081 B2  10/2002
WO   WO 2014/004349 A1  1/2014

OTHER PUBLICATIONS

Bear, Jacob, "Dynamics of Fluids in Porous Media" American Elsevier Publishing Company, Inc., 1972, pp. 161-177.

(Continued)

*Primary Examiner* — Ana M Fortuna
(74) *Attorney, Agent, or Firm* — Finnegan, Henderson, Farabow, Garrett & Dunner LLP

(57) ABSTRACT

A composite filter aid may include diatomaceous earth, natural glass, and a precipitated silica binder, wherein the filter aid has a permeability ranging from 3 to 20 darcys. A composite filter aid may include diatomaceous earth, perlite, and a precipitated silica binder, wherein the filter aid has an alpha density less than 15 lbs/ft$^3$. A method for making a composite material may include blending diatomaceous earth and perlite, adding alkali silicate to the blended diatomaceous earth and perlite, and precipitating the alkali silicate as a binder to make the composite material. A method for filtering a beverage may include using a composite filter aid and/or composite material.

21 Claims, 2 Drawing Sheets

Related U.S. Application Data

(60) Provisional application No. 61/664,395, filed on Jun. 26, 2012.

(51) Int. Cl.
| | |
|---|---|
| *B01J 20/02* | (2006.01) |
| *B01J 20/00* | (2006.01) |
| *B01J 20/14* | (2006.01) |
| *B01J 20/28* | (2006.01) |
| *B01J 20/10* | (2006.01) |
| *B01J 20/12* | (2006.01) |
| *B01J 20/30* | (2006.01) |
| *C12H 1/07* | (2006.01) |

(52) U.S. Cl.
CPC ............ *B01J 20/12* (2013.01); *B01J 20/2803* (2013.01); *B01J 20/28004* (2013.01); *B01J 20/28011* (2013.01); *B01J 20/28059* (2013.01); *B01J 20/28076* (2013.01); *B01J 20/28078* (2013.01); *B01J 20/28085* (2013.01); *B01J 20/30* (2013.01); *B01J 20/3042* (2013.01); *B01J 20/3078* (2013.01); *B01J 20/3085* (2013.01); *C12H 1/063* (2013.01); *B01J 2220/42* (2013.01)

(58) Field of Classification Search
CPC .............. B01J 20/28004; B01J 2220/42; B01J 20/3028; B01J 20/106; B01J 20/3042; B01D 2239/1216; B01D 39/2003; B01D 2311/2626; B01D 2253/106; C04B 14/08; C04B 18/021

See application file for complete search history.

(56) References Cited

U.S. PATENT DOCUMENTS

| | | | | |
|---|---|---|---|---|
| 7,293,661 | B2* | 11/2007 | Saaski | ...................... B01J 20/20 210/483 |
| 2003/0127022 | A1 | 7/2003 | Palm et al. | |
| 2009/0261041 | A1 | 10/2009 | Hu et al. | |
| 2011/0174732 | A1 | 7/2011 | Lu | |
| 2011/0195168 | A1 | 8/2011 | Wang | |
| 2012/0046165 | A1* | 2/2012 | Lu | ............................ B01J 20/10 502/406 |
| 2014/0171305 | A1* | 6/2014 | Nannini | ............... B01J 20/3078 502/411 |
| 2016/0317999 | A1* | 11/2016 | Wang | ...................... B01J 20/14 |

OTHER PUBLICATIONS

Klug, Harold P. and Alexander, Leroy E., "X-Ray Diffraction Procedures for Polycrystalline and Amorphous Materials", 2$^{nd}$ Ed. 1954, pp. 531-563.

International Search Report and Written Opinion dated Nov. 22, 2013, in PCT International Application No. PCT/US2013/047259, filed Jun. 24, 2013.

Supplementary European Search Report dated Apr. 28, 2016, in EP Application No. 13 80 9596, which corresponds to PCT/US2013/047259 (9 pages).

Database WPI, Week 199517; Thomson Scientific, London, GB, dated Feb. 21, 1995; XP002757105 (1 page).

Chinese Second Office Action for Chinese Application No. 201380044699.5, dated Aug. 9, 2016 and English translation thereof, (24 pages).

* cited by examiner

CO-AGGLOMERATED COMPOSITE MATERIALS

CLAIM OF PRIORITY/INCORPORATION BY REFERENCE

This is a continuation of U.S. patent application Ser. No. 14/408,786, filed Dec. 17, 2014, a U.S. national stage entry of PCT International Application PCT/US2013/047259, filed Jun. 24, 2013, which claims the benefits of priority to, and incorporates by reference herein in its entirety, U.S. Provisional Application No. 61/664,395, filed Jun. 26, 2012, to each of which this application claims the benefit of priority and the subject matter of each of which is incorporated herein by reference in its entirety.

FIELD OF THE DESCRIPTION

This disclosure is related to co-agglomerated composite materials, methods for making co-agglomerated composite materials, and methods for using co-agglomerated composite materials. More particularly, this disclosure is related to co-agglomerated composite materials that may be used in filtration applications, and methods for making and using such co-agglomerated composite materials.

BACKGROUND

In many filtration applications, a filtration device may include a filter element, such as a septum, and a filter-aid material. The filter element may be of any form such that it may support a filter-aid material. For example, the filter element may include a cylindrical tube or wafer-like structure covered with a plastic or metal fabric of sufficiently fine weave. The filter element may be a porous structure with a filter element void to allow material of a certain size to pass through the filtration device. The filter-aid material may include one or more filtration components, which, for example, may be inorganic powders or organic fibrous materials. Such a filter-aid material may be used in combination with a filter element to enhance filtration performance.

For example, the filter-aid material may initially be applied to a septum of a filter element in a process known as "pre-coating." Pre-coating may generally involve mixing a slurry of water and filter-aid material, and introducing the slurry into a stream flowing through the septum. During this process, a thin layer, such as, for example, about 1.5 mm to about 3.0 mm, of filter-aid material may eventually be deposited upon the septum, thus forming the filtration device.

During filtration of a fluid, various insoluble particles in the fluid may become trapped by the filter-aid material. The combined layers of filter-aid material and particles and/or constituents to be removed accumulate on the surface of the septum. Those combined layers are known as "filter cake." As more and more particles and/or constituents are deposited on the filter cake, the filter cake may become saturated with debris to the point where fluid is no longer able to pass through the septum.

To combat this situation, a process known as "body feeding" may be used. Body feeding is the process of introducing additional filter-aid material into the fluid to be filtered before the fluid reaches the filter cake. The filter-aid material will follow the path of the unfiltered fluid and will eventually reach the filter cake. Upon reaching the filter cake, the added filter-aid material will bind to the cake in a similar manner to how the filter-aid material is bound to the septum during the pre-coating process. The additional layer of filter-aid material may cause the filter cake to swell and thicken, and may increase the capacity of the filter cake to entrap additional debris. The filter aid typically has an open porous structure, which maintains an open structure in the filter cake, thus ensuring continued permeability of the filter cake.

In the field of fluid filtration, diatomaceous earth and natural glasses may be employed as filter aids. Diatomaceous earth products may be obtained from diatomaceous earth (also called "DE" or "diatomite"), which is generally known as a sediment-enriched in biogenic silica (i.e., silica produced or brought about by living organisms) in the form of siliceous skeletons (frustules) of diatoms. Diatoms are a diverse array of microscopic, single-celled, golden-brown algae generally of the class *Bacillariophyceae* that possess an ornate siliceous skeleton of varied and intricate structures including two valves that, in the living diatom, fit together much like a pill box.

Diatomaceous earth may form from the remains of waterborne diatoms and, therefore, diatomaceous earth deposits may be found close to either current or former bodies of water. Those deposits are generally divided into two categories based on source: freshwater and saltwater. Freshwater diatomaceous earth is generally mined from dry lakebeds and may be characterized as having a low crystalline silica content and a high iron content. In contrast, saltwater diatomaceous earth is generally extracted from oceanic areas and may be characterized as having a high crystalline silica content and a low iron content.

Natural glasses, commonly referred to as "volcanic glasses," are generally formed by the rapid cooling of siliceous magma or lava. Several types of natural glasses are known, including, for example, perlite, pumice, pumicite, obsidian, pitchstone, and volcanic ash. Prior to processing, perlite may be gray to green in color with abundant spherical cracks that cause it to break into small pearl-like masses. Perlite may thermally expand upon processing. Pumice is a lightweight glassy vesicular rock. Obsidian may be dark in color with a vitreous luster and a characteristic conchoidal fracture. Pitchstone has a waxy resinous luster and may be brown, green, or gray. Volcanic glasses such as perlite and pumice occur in massive deposits and find wide commercial use. Volcanic ash, often referred to as "tuff" when in consolidated form, may include small particles or fragments that may be in glassy form.

In the field of filtration, methods of particle separation from fluids may employ diatomaceous earth products or natural glass products as filter aids. The intricate and porous structure unique to diatomaceous earth may, in some instances, be effective for the physical entrapment of particles in filtration processes. It is known to employ diatomaceous earth products to improve the clarity of fluids that exhibit "turbidity" or contain suspended particles or particulate matter. "Turbidity" is the cloudiness or haziness of a fluid, where the haze may be caused by individual particles that are suspended in the fluid. Materials that may cause a fluid to be turbid include, for example, clay, silt, organic matter, inorganic matter, and microscopic organisms.

Diatomaceous earth and natural glass may be used in various aspects of filtration. For example, as a part of pre-coating, diatomaceous earth or natural glass products may be applied to a filter septum to assist in achieving, for example, any one or more of: protection of the septum, improvement in clarity, and expediting of filter cake removal. As a part of body feeding, diatomaceous earth or natural glass may be added directly to a fluid being filtered to assist in achieving, for example, either or both of: increasing flow rate and extending of the filtration cycle. Depending on the requirements of the specific separation process, diatomaceous earth or natural glass may be used in multiple stages including, but not limited to, in a pre-coating stage and in a body feeding stage.

Known diatomaceous earth or natural glass products may suffer from any number of attributes that make them inappropriate for filtration use, cause them to be less desirable, or cause them to have poor or improvable performance in a particular application, for instance in filtering applications. For example, known diatomaceous earth or natural glass products may have at least one of a high crystalline silica content, a high impurity content, and low permeability. Thus, it may be desirable to improve diatomaceous earth or natural glass products such that they exhibit improved performance in a given application, such as lower impurity content and/or higher permeability in filtration applications.

SUMMARY

In accordance with a first aspect, a composite filter aid includes diatomaceous earth, natural glass, and a precipitated silica binder, wherein the filter aid has a permeability ranging from 2 to 20 darcys. For example, the filter aid has a permeability ranging from 9 to 20 darcys or 15 to 20 darcys. The diatomaceous earth may be obtained from a freshwater source or a saltwater source. According to a further aspect, the diatomaceous earth includes at least one of calcined diatomaceous earth and flux calcined diatomaceous earth. The natural glass may include at least one of perlite, volcanic ash, pumice, shirasu, obsidian, pitchstone, and rice hull ash. The precipitated silica binder may include sodium silicate and/or potassium silicate.

According to a further aspect, the composite filter aid has a $d_{10}$ ranging from 10 to 30 microns, a $d_{50}$ ranging from 30 to 70 microns, and a $d_{90}$ ranging from 80 to 120 microns. The diatomaceous earth has a $d_{10}$ ranging from 5 to 15 microns, a $d_{50}$ ranging from 20 to 70 microns, and a $d_{90}$ ranging from 50 to 130 microns. The natural glass has a $d_{10}$ ranging from 10 to 30 microns, a $d_{50}$ ranging from 15 to 80 microns, and a $d_{90}$ ranging from 50 to 150 microns.

According to yet another aspect, a ratio of the diatomaceous earth to the natural glass ranges from 1:99 to 99:1 by weight. For example, the ratio of the diatomaceous earth to the natural glass ranges from 1:3 to 3:1 by weight.

According to a further aspect, the composite filter aid has a BET surface area ranging from 5 $m^2/g$ to 50 $m^2/g$. According to yet another aspect, the composite filter aid has a median pore size ranging from 5 to 35 microns, and a surface area ranging from 5 to 40 $m^2/g$. According to another aspect, the porosity of the composite filter aid ranges from 3 to 7 liters per milligram.

According to still another aspect, the composite filter aid has a beer soluble iron content of less than 5 ppm, as measured by ASBC. For example, the filter aid has a beer soluble iron content of less than 1 ppm, as measured by ASBC.

According to yet another aspect, the filter aid has a cristobalite content of less than 20% by weight. For example, the filter aid has a cristobalite content of less than 10% by weight, less than 6% by weight, or less than 1% by weight.

According to another aspect, the filter aid has a wet density ranging from 10 to 16 $lbs/ft^3$. According to a further aspect, the filter aid has a wet density ranging from 9 to 15 $lbs/ft^3$.

According to yet another aspect, a composite filter aid includes diatomaceous earth, perlite, and a precipitated silica binder, wherein the filter aid has a wet density less than 15 $lbs/ft^3$.

According to still another aspect, a method for making a composite material includes blending diatomaceous earth and perlite, adding alkali silicate to the blended diatomaceous earth and perlite, and precipitating the alkali silicate as a binder to make the composite material. The method may further include dispersing the alkali silicate in water. For example, the method may further include dispersing the alkali silicate in water before adding the alkali silicate to the blended diatomaceous earth and perlite. The method may further include mixing the alkali silicate and the blended diatomaceous earth and perlite. The method may further include classifying the mixed alkali silicate and blended diatomaceous earth and perlite. The method may further include drying the mixed alkali silicate and blended diatomaceous earth and perlite. For example, the drying may include heating the mixed alkali silicate and blended diatomaceous earth and perlite to a temperature ranging from 100° C. to 200° C. The method may further include, after drying the mixture, classifying the mixture. The method may further include, prior to blending the diatomaceous earth and perlite, calcining the diatomaceous earth.

According to yet another aspect, a method for filtering a beverage includes using a composite filter aid and/or composite material. For example, the composite filter aid may include diatomaceous earth, natural glass, and a precipitated silica binder, wherein the filter aid has a permeability ranging from 2 to 20 darcys. The composite filter aid may include diatomaceous earth, perlite, and a precipitated silica binder, wherein the filter aid has a wet density less than 15 $lbs/ft^3$.

It is to be understood that both the foregoing general description and the following detailed description are exemplary and explanatory only and are not restrictive of the invention, as claimed.

DESCRIPTION OF EXEMPLARY EMBODIMENTS

Figure 1:
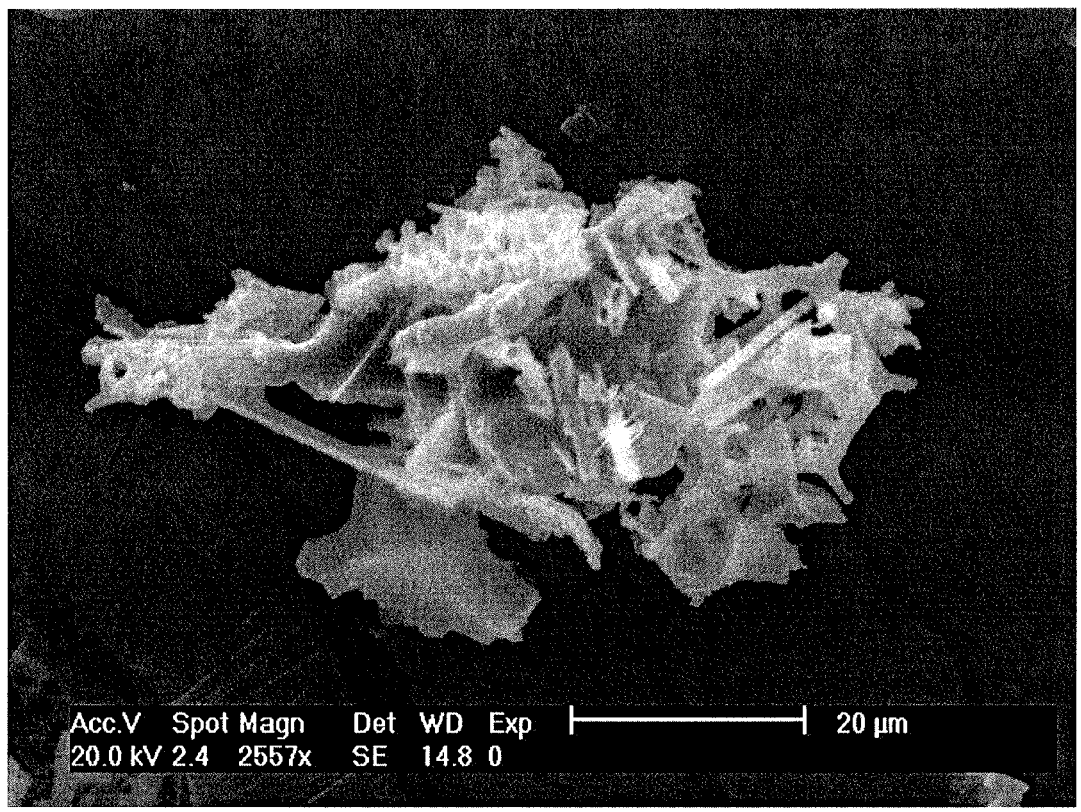
FIG. 1 is a scanning electron micrograph of an example of co-agglomerated particles of diatomaceous earth and perlite according to an exemplary embodiment of a composite material.

According to some embodiments, a composite material may include a co-agglomeration of diatomaceous earth and natural glass. For example, the diatomaceous earth and natural glass may be blended and contacted with a solution of silica binder, so that the blended diatomaceous earth and natural glass co-agglomerate. The composite material may be used as, for example, a filter aid. The resulting filter aid may exhibit increased permeability and/or reduced turbidity. While not wishing to be bound by theory, it is believed that the co-agglomeration of diatomaceous earth and natural glass results in the diatomaceous earth and natural glass particles attaching to one another to form larger particles relative to a blend of diatomaceous earth and natural glass particles that has not been co-agglomerated.

According to some embodiments, a composite filter aid includes diatomaceous earth, natural glass, and a precipitated silica binder, wherein the filter aid has a permeability ranging from 2 to 20 darcys. For example, the filter aid has a permeability ranging from 9 to 20 darcys or 15 to 20 darcys. The diatomaceous earth may be obtained from a freshwater source or a saltwater source. According to some embodiments, the diatomaceous earth includes at least one of calcined diatomaceous earth and flux calcined diatomaceous earth. The natural glass may include at least one of perlite, volcanic ash, pumice, shirasu, obsidian, pitchstone, and rice hull ash. According to some embodiments, the precipitated silica binder may include sodium silicate and/or potassium silicate.

According to some embodiments, the composite filter aid has a $d_{10}$ ranging from 10 to 30 microns, a $d_{50}$ ranging from 30 to 70 microns, and a $d_{90}$ ranging from 80 to 120 microns. According to some embodiments, the diatomaceous earth has a $d_{10}$ ranging from 7 to 20 microns, a $d_{50}$ ranging from 20 to 50 microns, and a $d_{90}$ ranging from 60 to 120 microns. According to some embodiments, the natural glass has a $d_{10}$ ranging from 10 to 20 microns, a $d_{50}$ ranging from 30 to 70 microns, and a $d_{90}$ ranging from 100 to 160 microns.

According to some embodiments, a ratio of the diatomaceous earth to the natural glass ranges from 1:99 to 99:1 by weight. For example, the ratio of the diatomaceous earth to the natural glass ranges from 1:3 to 3:1 by weight.

According to some embodiments, the composite filter aid has a BET surface area ranging from 5 $m^2/g$ to 50 $m^2/g$. According to some embodiments, the composite filter aid has a median pore size ranging from 5 to 35 microns, and/or a surface area ranging from 5 to 40 $m^2/g$. According to some embodiments, the porosity of the composite filter aid ranges from 3 to 7 liters per milligram.

According to some embodiments, the composite filter aid has a beer soluble iron content of less than 5 ppm, as measured by ASBC. For example, the filter aid has a beer soluble iron content of less than 1 ppm, as measured by ASBC.

According to some embodiments, the composite filter aid has a cristobalite content of less than 20% by weight. For example, the filter aid has a cristobalite content of less than 10% by weight, less than 6% by weight, or less than 1% by weight.

According to some embodiments, the filter aid has a wet density ranging from 10 to 16 $lbs/ft^3$. According to a further aspect, the filter aid has a wet density ranging from 9 to 15 $lbs/ft^3$.

According to some embodiments, a composite filter aid includes diatomaceous earth, perlite, and a precipitated silica binder, wherein the filter aid has a wet density less than 15 $lbs/ft^3$.

According to some embodiments, a method for making a composite filter aid includes blending diatomaceous earth and perlite, adding alkali silicate to the blended diatomaceous earth and perlite, and precipitating the alkali silicate as a binder to make the composite material. The method may further include dispersing the alkali silicate in water. For example, the method may further include dispersing the alkali silicate in water before adding the alkali silicate to the blended diatomaceous earth and perlite. The method may further include mixing the alkali silicate and the blended diatomaceous earth and perlite. According to some embodiments, the method may further include classifying the mixed alkali silicate and blended diatomaceous earth and perlite. The method may further include drying the mixed alkali silicate and blended diatomaceous earth and perlite. For example, the drying may include heating the mixed alkali silicate and blended diatomaceous earth and perlite to a temperature ranging from 100° C. to 200° C. The method may further include, after drying the mixture, classifying the mixture. The method may further include, prior to blending the diatomaceous earth and perlite, calcining the diatomaceous earth.

According to some embodiments, a method for filtering a beverage includes using a composite filter aid and/or composite material. For example, the composite filter aid or composite material may include diatomaceous earth, natural glass, and a precipitated silica binder, wherein the filter aid has a permeability ranging from 2 to 20 darcys. The composite filter aid and/or composite material may include diatomaceous earth, perlite, and a precipitated silica binder, wherein the filter aid has a wet density less than 15 $lbs/ft^3$.

Natural Diatomaceous Earth

Processes for preparing the diatomaceous earth products include at least one natural diatomaceous earth as a starting material. As used herein, the term "natural diatomaceous earth" means any diatomaceous earth material that has not been subjected to thermal treatment (e.g., calcination) sufficient to induce formation of greater than 1% cristobalite. For example, "natural diatomaceous earth" may include diatomaceous earth comprising uncalcined diatomaceous earth. In some embodiments, the at least one natural diatomaceous earth is obtained from a saltwater source. In some embodiments, the at least one natural diatomaceous earth is obtained from a freshwater source. In further embodiments, the at least one natural diatomaceous earth is any diatomaceous earth material that may be capable of use in composite material such as a composite filter aid, either in its crude form or after subjecting the material to one or more processing steps. In some embodiments, the at least one natural diatomaceous earth is any diatomaceous earth material that has not been subjected to at least one thermal treatment. In still other embodiments, the at least one natural diatomaceous earth is any diatomaceous earth material that has not been subjected to calcination. Average particle size for the diatomaceous earth ranges from 5 to 200 microns, surface area ranges from 1 to 80 $m^2/g$, pore volume ranges from 2 to 10 L/mg with median pore size from 1 to 20 microns.

As stated earlier, natural diatomaceous earth is, in general, a sedimentary biogenic silica deposit including the fossilized skeletons of diatoms, one-celled algae-like plants that accumulate in marine or fresh water environments. Honeycomb silica structures generally give diatomaceous earth useful characteristics such as absorptive capacity and surface area, chemical stability, and low-bulk density. In some embodiments, natural diatomaceous earth includes about 90% $SiO_2$ mixed with other substances. In some embodiments, crude diatomaceous earth includes about 90% $SiO_2$, plus various metal oxides, such as, but not limited to, Al, Fe, Ca, and Mg oxides.

The at least one natural diatomaceous earth may have any of various appropriate forms now known to the skilled artisan or hereafter discovered. In some embodiments, the at least one natural diatomaceous earth is unprocessed (e.g., it is not subjected to chemical and/or physical modification processes). Without wishing to be bound by theory, the impurities in natural diatomaceous earth, such as clays and organic matters, may, in some instances, provide higher cation exchange capacity. In some embodiments, the at least one natural diatomaceous earth undergoes minimal processing following mining or extraction. In some embodiments, the at least one natural diatomaceous earth is subjected to at least one physical modification process. Some examples of possible physical modification processes include, but are not limited to, milling, drying, and air classifying. In some embodiments, the at least one natural diatomaceous earth is subjected to at least one chemical modification process. An example of a chemical modification processes is silanization, but other chemical modification processes are contemplated. Silanization may be used to render the surfaces of the at least one natural diatomaceous earth either more hydrophobic or hydrophilic using the methods appropriate for silicate minerals.

Natural Glass

The term "natural glass" as used herein refers to natural glasses, commonly referred to as volcanic glasses, that are formed by the rapid cooling of siliceous magma or lava. Several types of natural glasses are known, including, for example, perlite, pumice, pumicite, shirasu, obsidian, and pitchstone. Prior to processing, perlite may be gray to green in color with abundant spherical cracks that cause it to break into small pearl-like masses. Pumice is a lightweight glassy vesicular rock. Obsidian may be dark in color with a vitreous luster and a characteristic conchoidal fracture. Pitchstone has a waxy resinous luster and may be brown, green, or gray. Volcanic glasses such as perlite and pumice occur in massive deposits and find wide commercial use. Volcanic ash, often referred to as tuff when in consolidated form, includes small particles or fragments that may be in glassy form. As used herein, the term natural glass encompasses volcanic ash.

Natural glasses may be chemically equivalent to rhyolite. Natural glasses that are chemically equivalent to trachyte, dacite, andesite, latite, and basalt are known but may be less common. The term "obsidian" is generally applied to large numbers of natural glasses that are rich in silica. Obsidian glasses may be classified into subcategories according to their silica content, with rhyolitic obsidians (containing typically about 73% $SiO_2$ by weight) being the most common.

Perlite is a hydrated natural glass that may contain, for example, about 72 to about 75% $SiO_2$, about 12 to about 14% $Al_2O_3$, about 0.5 to about 2% $Fe_2O_3$, about 3 to about 5% $Na_2O$, about 4 to about 5% $K_2O$, about 0.4 to about 1.5% CaO (by weight), and small amounts of other metallic elements. Perlite may be distinguished from other natural glasses by a higher content (such as about 2 to about 5% by weight) of chemically-bonded water, the presence of a vitreous, pearly luster, and characteristic concentric or arcuate onion skin-like (i.e., perlitic) fractures.

Perlite products may be prepared by milling and thermal expansion, and may possess unique physical properties such as high porosity, low bulk density, and chemical inertness. Average particle size for the milled expanded perlite ranges from 5 to 200 microns, pore volume ranges from 2 to 10 L/mg with median pore size from 5 to 20 microns.

Pumice is a natural glass characterized by a mesoporous structure (e.g., having pores or vesicles with a size up to about 1 mm). The porous nature of pumice gives it a very low apparent density, in many cases allowing it to float on the surface of water. Most commercial pumice contains from about 60% to about 70% $SiO_2$ by weight. Pumice may be processed by milling and classification, and products may be used as lightweight aggregates and also as abrasives, adsorbents, and fillers. Unexpanded pumice and thermally-expanded pumice may also be used as filtration components.

Silica Binder

The diatomaceous earth and natural glass may be subjected to at least one co-agglomeration with at least one silica binder. For example, in some embodiments, the silica binder is at least one alkali silica binder. In some embodiments, the silica binder is at least one of sodium silicate and potassium silicate.

Co-Agglomeration

Co-agglomeration of diatomaceous earth material, natural glass, and silica binder, or of heat treated diatomaceous earth, natural glass, and silica binder, may occur through any appropriate agglomeration processes now known to the skilled artisan or hereafter discovered. For example, in some embodiments, co-agglomeration includes preparing at least one aqueous solution of the silica binder, and contacting the silica binder solution with a blend of the diatomaceous earth and natural glass. One or more agglomerations may be performed, for example, when multiple silica binders, multiple diatomaceous earths, and/or multiple natural glasses solutions are used.

In some embodiments, contacting includes mixing the silica binder solution with a blend of the diatomaceous earth and natural glass. In some embodiments, the mixing includes agitation. In some embodiments, the blend of diatomaceous earth material and natural glass and a silica binder solution are mixed sufficiently to at least substantially uniformly distribute the silica binder solution among the agglomeration points of contact of the diatomaceous earth and natural glass. In some embodiments, the blend of the diatomaceous earth and natural glass and the silica binder solution are mixed with sufficient agitation to at least substantially uniformly distribute the silica binder solution among the agglomeration points of contact of the blend of diatomaceous earth and natural glass without damaging the structure of the diatomaceous earth or natural glass. In some embodiments, the contacting includes low-shear mixing.

In some embodiments, mixing occurs for about one hour. In other embodiments, mixing occurs for less than about one hour. In further embodiments, mixing occurs for about 30 minutes. In yet other embodiments, mixing occurs for about 20 minutes. In still further embodiments, mixing occurs for about 10 minutes.

In some embodiments, mixing occurs at about room temperature (i.e., from about 20° C. to about 23° C.). In other embodiments, mixing occurs at a temperature of from about 20° C. to about 50° C. In further embodiments, mixing occurs at a temperature of from about 30° C. to about 45° C. In still other embodiments, mixing occurs at a temperature of from about 35° C. to about 40° C.

According to some embodiments, contacting includes spraying the blend of the diatomaceous earth and the natural glass with at least one silica binder solution. In some embodiments, the spraying is intermittent. In other embodiments, the spraying is continuous. In further embodiments, spraying includes mixing the blend of diatomaceous earth and natural glass while spraying with the at least one silica binder solution, for example, to expose different agglomeration points of contacts to the spray. In some embodiments, such mixing is intermittent. In other embodiments, such mixing is continuous.

In some embodiments, the at least one silica binder is present in the binder solution in an amount from less than about 40% by weight, relative to the weight of the at least one binder solution. In some embodiments, the at least one silica binder ranges from about 1% to about 10% by weight. In further embodiments, the at least one silica binder ranges from about 1% to about 5% by weight.

The at least one aqueous solution of the at least one silica binder may be prepared with water. In some embodiments, the water is deionized water. In some embodiments, the water is ultrapure water. In further embodiments, the water has been treated to remove or decrease the levels of metals, toxins, and/or other undesirable elements before it is contacted with the at least one silica binder.

The amount of at least one aqueous solution contacted with the blend of diatomaceous earth and natural glass may range from about 0.25 parts to about 1.5 parts of aqueous solution to one part blend. In some embodiments, about 1 part aqueous solution is contacted with about 1 part blend.

Classification

Before and/or after the agglomeration, the diatomaceous earth and/or the natural glass may be subjected to at least one classification step. For example, before and/or after at least one heat treatment, the diatomaceous earth may, in some embodiments, be subjected to at least one classification step. In some embodiments, the particle size of the diatomaceous earth material and/or natural glass is adjusted to a suitable or desired size using any one of several techniques well known in the art. In some embodiments, the diatomaceous earth material and/or natural glass is subjected to at least one mechanical separation to adjust the powder size distribution. Appropriate mechanical separation techniques are well known to the skilled artisan and include, but are not limited to, milling, grinding, screening, extrusion, triboelectric separation, liquid classification, aging, and air classification.

Heat Treatment

The natural diatomaceous earth, natural glass, and/or co-agglomerated diatomaceous earth and natural glass may be subjected to at least one heat treatment. Appropriate heat treatment processes are well-known to the skilled artisan, and include those now known or that may hereinafter be discovered. In some embodiments, the at least one heat treatment decreases the amount of organics and/or volatiles in the heat-treated diatomaceous earth and/or natural glass. In some embodiments, the at least one heat treatment includes at least one calcination. In some embodiments, the at least one heat treatment includes at least one flux calcination. In some embodiments, the at least one heat treatment includes at least one roasting.

Calcination may be conducted according to any appropriate process now known to the skilled artisan or hereafter discovered. In some embodiments, calcination is conducted at temperatures below the melting point of the diatomaceous earth and/or natural glass. In some embodiments, calcination is conducted at a temperature ranging from about 600° C. to about 1100° C. In some embodiments, the calcination temperature ranges from about 600° C. to about 700° C. In some embodiments, the calcination temperature ranges from about 700° C. to about 800° C. In some embodiments, the calcination temperature ranges from about 800° C. to about 900° C. In some embodiments, the calcination temperature is chosen from the group consisting of about 600° C., about 700° C., about 800° C., about 900° C., about 1000° C., and about 1100° C. Heat treatment at a lower temperature may result in an energy savings over other processes for the preparation of diatomaceous earth and/or natural glass.

Flux calcination includes conducting at least one calcination in the presence of at least one fluxing agent. Flux calcination may be conducted according to any appropriate process now known to the skilled artisan or hereafter discovered. In some embodiments, the at least one fluxing agent is any material now known to the skilled artisan or hereafter discovered that may act as a fluxing agent. In some embodiments, the at least one fluxing agent is a salt including at least one alkali metal. In some embodiments, the at least one fluxing agent is chosen from the group consisting of carbonate, silicate, chloride, and hydroxide salts. In other embodiments, the at least one fluxing agent is chosen from the group consisting of sodium, potassium, rubidium, and cesium salts. In still further embodiments, the at least one fluxing agent is chosen from the group consisting of sodium, potassium, rubidium, and cesium carbonate salts.

Roasting may be conducted according to any appropriate process now known to the skilled artisan or hereafter discovered. In some embodiments, roasting is a calcination process conducted at a generally lower temperature that helps to avoid formation of crystalline silica in the diatomaceous earth and/or natural glass. In some embodiments, roasting is conducted at a temperature ranging from about 450° C. to about 900° C. In some embodiments, the roasting temperature ranges from about 500° C. to about 800° C. In some embodiments, the roasting temperature ranges from about 600° C. to about 700° C. In some embodiments, the roasting temperature ranges from about 700° C. to about 900° C. In some embodiments, the roasting temperature is chosen from the group consisting of about 450° C., about 500° C., about 600° C., about 700° C., about 800° C., and about 900° C.

According to some embodiments, the diatomaceous earth and/or natural glass may be subjected to at least one heat treatment, followed by co-agglomerating the heat treated diatomaceous earth and/or heat treated natural glass with at least one silica binder.

Composite

The composite material made by the processes described herein may have one or more beneficial attributes, making them desirable for use in one or a number of given applications. In some embodiments, the composite materials may be useful as part of a filter aid composition. In some embodiments, a filter aid composition may include at least one composite material.

The composite filter aids disclosed herein may have a permeability suitable for use in a filter aid composition. Permeability may be measured by any appropriate measurement technique now known to the skilled artisan or hereafter discovered. Permeability is generally measured in darcy units or darcy, as determined by the permeability of a porous bed 1 cm high and with a 1 cm² section through which flows a fluid with a viscosity of 1 mPa·s with a flow rate of 1 cm³/sec under an applied pressure differential of 1 atmosphere. The principles for measuring permeability have been previously derived for porous media from Darcy's law (see, for example, J. Bear, "The Equation of Motion of a Homogeneous Fluid: Derivations of Darcy's Law," in *Dynamics of Fluids in Porous Media* 161-177 (2nd ed. 1988)). An array of devices and methods are in existence that may correlate with permeability. In one exemplary method useful for measuring permeability, a specially constructed device is designed to form a filter cake on a septum from a suspension of filtration media in water; the time required for a specified volume of water to flow through a measured thickness of filter cake of known cross-sectional area is measured.

In some embodiments, the composite material has a permeability ranging from about 2 darcys to about 20 darcys. In some embodiments, the composite material has a permeability ranging from about 3 darcys to about 16 darcys. In some embodiments, the composite material has a permeability ranging from about 5 darcys to about 16 darcys. In some embodiments, permeability ranges from about 9 darcys to about 16 darcys. In some embodiments, the permeability ranges from about 11 darcys to about 16 darcys.

The composite materials disclosed herein have a particle size. Particle size may be measured by any appropriate measurement technique now known to the skilled artisan or hereafter discovered. In one exemplary method, particle size and particle size properties, such as particle size distribution ("psd"), are measured using a Leeds and Northrup Microtrac X100 laser particle size analyzer (Leeds and Northrup, North Wales, Pa., USA), which can determine particle size distribution over a particle size range from 0.12 µm to 704 µm. The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value.

In some embodiments, the $d_{10}$ of the composite material ranges from about 10 µm to about 30 µm. In some embodiments, the $d_{10}$ ranges from about 15 µm to about 30 µm. In some embodiments, the $d_{10}$ ranges from about 20 µm to about 30 µm.

In some embodiments, the $d_{50}$ of the composite material ranges from about 30 µm to about 70 µm. In some embodiments, the $d_{50}$ ranges from about 50 µm to about 70 µm. In some embodiments, the $d_{50}$ ranges from about 60 µm to about 70 µm.

In some embodiments, the $d_{90}$ of the composite material ranges from about 80 µm to about 120 µm. In some embodiments, the $d_{90}$ ranges from about 90 µm to about 120 µm. In some embodiments, the $d_{90}$ ranges from about 100 µm to about 120 µm. In some embodiments, the $d_{90}$ ranges from about 110 µm to about 120 µm.

The composite materials disclosed herein may have a low crystalline silica content. Forms of crystalline silica include, but are not limited to, quartz, cristobalite, and tridymite. In some embodiments, the composite material has a lower content of at least one crystalline silica than a composite material not subjected to at least one co-agglomeration with at least one silica binder.

The composite materials disclosed herein may have a low cristobalite content. Cristobalite content may be measured by any appropriate measurement technique now known to the skilled artisan or hereafter discovered. In one exemplary method, cristobalite content is measured by x-ray diffraction. Cristobalite content may be measured, for example, by the quantitative X-ray diffraction method outlined in H. P. Klug and L. E. Alexander, *X-Ray Diffraction Procedures for Polycrystalline and Amorphous Materials* 531-563 (2nd ed. 1972), which is incorporated by reference herein in its entirety. According to one example of that method, a sample is milled in a mortar and pestle to a fine powder, then back-loaded into a sample holder. The sample and its holder are placed into the beam path of an X-ray diffraction system and exposed to collimated X-rays using an accelerating voltage of 40 kV and a current of 20 mA focused on a copper target. Diffraction data are acquired by step-scanning over the angular region representing the interplanar spacing within the crystalline lattice structure of cristobalite, yielding the greatest diffracted intensity. That region ranges from 21 to 23 2θ (2-theta), with data collected in 0.05 2θ steps, counted for 20 seconds per step. The net integrated peak intensity is compared with those of standards of cristobalite prepared by the standard additions method in amorphous silica to determine the weight percent of the cristobalite phase in a sample.

In some embodiments, the cristobalite content is less than about 20% by weight. In some embodiments, the cristobalite content is less than about 10% by weight. In some embodiments, the cristobalite content is less than about 6% by weight. In some embodiments, the cristobalite content is less than about 1% by weight. In some embodiments, the composite material has a lower cristobalite content than materials not subjected to co-agglomeration with natural glass and at least one silica binder.

Composite materials disclosed herein may have a low quartz content. Quartz content may be measured by any appropriate measurement technique now known to the skilled artisan or hereafter discovered. In one exemplary method, quartz content is measured by x-ray diffraction. For example, quartz content may be measured by the same x-ray diffraction method described above for cristobalite content, except the that 2θ region ranges from 26.0 to 27.5 degrees. In some embodiments, the quartz content is less than about 0.5% by weight. In some embodiments, the quartz content is less than about 0.25% by weight. In some embodiments, the quartz content is less than about 0.1% by weight. In some embodiments, the quartz content is about 0% by weight. In some embodiments, the quartz content ranges from about 0% to about 0.5% by weight. In some embodiments, the quartz content ranges from about 0% to about 0.25% by weight.

Composite materials disclosed herein may have a measurable pore volume. Pore volume may be measured by any appropriate measurement technique now known to the skilled artisan or hereafter discovered. In one exemplary method, pore volume is measured with an AutoPore IV 9500 series mercury porosimeter from Micromeritics Instrument Corporation (Norcross, Ga., USA), which can determine measure pore diameters ranging from 0.006 to 600 µm. As used to measure the pore volume of the composite materials disclosed herein, that porosimeter's contact angle was set at 130 degrees, and the pressure ranged from 0 to 33,000 psi. In some embodiments, the pore volume is about equal to at least one natural diatomaceous earth and/or natural glass from which it is made. In some embodiments, the pore volume ranges from about 3 mL/g to about 10 mL/g. In some embodiments, the pore volume ranges from about 4 mL/g to about 8 mL/g. In some embodiments, the pore volume ranges from about 5 mL/g to about 7 mL/g. In some embodiments, the pore volume is about 6 mL/g.

Composite materials disclosed herein may have a measurable median pore diameter. Median pore diameter may be measured by any appropriate measurement technique now known to the skilled artisan or hereafter discovered. In one exemplary method, median pore diameter is measured with an AutoPore IV 9500 series mercury porosimeter, as described above. In some embodiments, the median pore diameter ranges from about 10 µm to about 40 µm. In some embodiments, the median pore diameter ranges from about 15 µm to about 30 µm. In some embodiments, the median pore diameter ranges from about 20 µm to about 30 µm.

Composite materials disclosed herein may have a measurable wet density, which as used herein refers to measurement of centrifuged wet density. According to one exemplary method, to measure wet density, a composite material sample of known weight from about 1.00 to about 2.00 g is placed in a calibrated 15 ml centrifuge tube to which deionized water is added to make up a volume of approximately 10 ml. The mixture is shaken thoroughly until all of the sample is wetted, and no powder remains. Additional deionized water is added around the top of the centrifuge tube to rinse down any mixture adhering to the side of the tube from shaking. The tube is centrifuged for 5 minutes at 2500 rpm on an IEC Centra® MP-4R centrifuge, equipped with a Model 221 swinging bucket rotor (International Equipment Company; Needham Heights, Mass., USA). Following centrifugation, the tube is carefully removed without disturbing the solids, and the level (i.e., volume) of the settled matter is measured in $cm^3$. The centrifuged wet density of powder is readily calculated by dividing the sample weight by the measured volume. In some embodiments, the wet density ranges from about 10 $lbs/ft^3$ to about 20 $lbs/ft^3$. In some embodiment, the wet density ranges from about 10 $lbs/ft^3$ to about 16 $lbs/ft^3$.

Composite materials disclosed herein may include at least one soluble metal. As used herein, the term "soluble metal" refers to any metal that may be dissolved in at least one liquid. Soluble metals are known to those of skill in the art and include, but are not limited to, iron, aluminum, calcium, vanadium, chromium, copper, zinc, nickel, cadmium, and mercury. When a filter aid including a composite material is used to filter at least one liquid, at least one soluble metal may dissociate from the composite material filter aid and enter the liquid. In many applications, such an increase in metal content of the liquid may be undesirable and/or unacceptable. For example, when a filter aid including a composite material is used to filter beer, a high level or iron dissolved in the beer from the filter aid may adversely affect sensory or other properties, including but not limited to taste and shelf-life.

Any appropriate protocol or test for measuring levels of at least one soluble metal in composite materials may be used, including those now known to the skilled artisan or hereafter discovered. For example, the brewing industry has developed at least one protocol to measure the beer soluble iron (BSI) of composite material filter aids. BSI refers to the iron content, which may be measured in parts per million, of a filter aid including an material that dissociates in the presence of a liquid, such as beer. The European Beverage Convention (EBC) method contacts liquid potassium hydrogen phthalate with the filter aid and then analyzes the liquid for iron content. More specifically, the EBC method uses, for example, a 10 g/L solution of potassium hydrogen phthalate (KHP, $KHC_8H_4O_4$) as the extractant along with a given quantity of filter aid material, with a total contact time of two hours. Extracts are then analyzed for iron concentration by the FERROZINE method.

In some embodiments, the beer soluble iron of the composite material disclosed herein ranges from less about 1 ppm to about 5 ppm, when measured using an ASBC method. In some embodiments, the beer soluble iron ranges from about 1 ppm to about 4 ppm. In some embodiments, the beer soluble iron ranges from about 1 ppm to about 2 ppm. In some embodiments, the beer soluble iron is less than about 1 ppm.

The composite materials disclosed herein may have a measurable BET surface area. BET surface area, as used herein, refers to the technique for calculating specific surface area of physical absorption molecules according to Brunauer, Emmett, and Teller ("BET") theory. BET surface area may be measured by any appropriate measurement technique now known to the skilled artisan or hereafter discovered. In one exemplary method, BET surface area is measured with a Gemini III 2375 Surface Area Analyzer, using pure nitrogen as the sorbent gas, from Micromeritics Instrument Corporation (Norcross, Ga., USA). In some embodiments, the BET surface area is greater than for an material not produced according to embodiments described herein (e.g., without co-agglomerating diatomaceous earth and natural glass with at least one silica binder). In some embodiments, the BET surface area ranges from about 1 $m^2/g$ to about 50 $m^2/g$. In some embodiments, the BET surface area ranges from about 5 $m^2/g$ to about 30 $m^2/g$. In some embodiments, the BET surface area is greater than about 10 $m^2/g$.

Exemplary Uses for Composite Materials

The exemplary composite materials disclosed herein may be used in any of a variety of processes, applications, and materials. For example, the composite materials may be used in at least one process, application, or material in which such a product with a high BET surface area is desirable.

For example, the composite materials may be incorporated into a filter aid material or composition. A filter aid composition including at least one composite material may optionally include at least one additional filter aid medium. Examples of suitable additional filter aid media include, but are not limited to, natural or synthetic silicate or aluminosilicate materials, unimproved diatomaceous earth, saltwater diatomaceous earth, expanded perlite, pumicite, natural glass, cellulose, activated charcoal, feldspars, nepheline syenite, sepiolite, zeolite, and clay.

The at least one additional filter medium may be present in any appropriate amount. For example, the at least one additional filter medium may be present from about 0.01 to about 100 parts of at least one additional filter medium per part of the composite material. In some embodiments, the at least one additional filter medium is present from about 0.1 to about 10 parts. In some embodiments, the at least one additional filter medium is present from about 0.5 to 5 parts.

The filter aid composition may be formed into sheets, pads, cartridges, or other monolithic or aggregate media capable of being used as supports or substrates in a filter process. Considerations in the manufacture of filter aid compositions may include a variety of parameters, including but not limited to total soluble metal content of the composition, median soluble metal content of the composition, particle size distribution, pore size, cost, and availability.

A filter aid composition including at least one composite material may be used in a variety of processes and compositions. In some embodiments, the filter aid composition is applied to a filter septum to protect it and/or to improve clarity of the liquid to be filtered in a filtration process. In some embodiments, the filter aid composition is added directly to a beverage to be filtered to increase flow rate and/or extend the filtration cycle. In some embodiments, the filter aid composition is used as pre-coating, in body feeding, or a combination of both pre-coating and body feeding, in a filtration process.

Embodiments of the composite material may also be used in a variety of filtering methods. In some embodiments, the filtering method includes pre-coating at least one filter element with at least one composite material, and contacting at least one liquid to be filtered with the at least one coated filter element. In such embodiments, the contacting may include passing the liquid through the filter element. In some embodiments, the filtering method includes suspending at least one composite material filter aid in at least one liquid containing particles to be removed from the liquid, and thereafter separating the filter aid from the filtered liquid.

Filter aids including at least one composite material disclosed herein may also be employed to filter various types of liquids. The skilled artisan is readily aware of liquids that may be desirably filtered with a process including the filter aids including at least composite material disclosed herein. In some embodiments, the liquid is a beverage. Exemplary beverages include, but are not limited to, vegetable-based juices, fruit juices, distilled spirits, and malt-based liquids. Exemplary malt-based liquids include, but are not limited to, beer and wine. In some embodiments, the liquid is one that tends to form haze upon chilling. In some embodiments, the liquid is a beverage that tends to form haze upon chilling. In some embodiments, the liquid is a beer. In some embodiments, the liquid is an oil. In some embodiments, the liquid is an edible oil. In some embodiments, the liquid is a fuel oil. In some embodiments, the liquid is water, including but not limited to waste water. In some embodiments, the liquid is blood. In some embodiments, the liquid is a sake. In some embodiments, the liquid is a sweetener, such as, for example, corn syrup or molasses.

The composite materials disclosed herein may also be used in applications other than filtration. In some embodiments, the composite materials may be used as composites in filler applications, such as, for example, fillers in construction or building materials. In some embodiments, the composite materials may be used to alter the appearance and/or properties of paints, enamels, lacquers, or related coatings and finishes. In some embodiments, the composite materials may be used in paper formulations and/or paper processing applications. In some embodiments, the composite materials may be used to provide anti-block and/or reinforcing properties to polymers. In some embodiments, the composite materials may be used as or in abrasives. In some embodiments, the composite materials may be used for buffing or in buffing compositions. In some embodiments, the composite materials may be used for polishing or in polishing compositions. In some embodiments, the composite materials may be used in the processing and/or preparation of catalysts. In some embodiments, the composite materials may be used as chromatographic supports or other support media. In some embodiments, the composite materials may be blended, mixed, or otherwise combined with other ingredients to make monolithic or aggregate media useful in a variety of applications, including but not limited to supports (e.g., for microbe immobilization) and substrates (e.g., for enzyme immobilization).

EXAMPLES

Several examples consistent with the composite materials disclosed herein, along with several comparative examples, are described below. The examples were used as filter aids which were tested, and properties of the examples are provided in Table 1.

For the examples, a commercially available flux-calcined diatomite product was used as the diatomaceous earth feed material. This diatomaceous earth feed material had the following particle size distribution: a $d_{10}$ of 9.89 microns, a $d_{50}$ of 34.96 microns, and $d_{90}$ of 99.83 microns. A commercially available, expanded and milled perlite product was used as the natural glass feed material. This natural glass feed material had the following particle size distribution: a $d_{10}$ of 18.93 microns, a $d_{50}$ of 56.37 microns, and a $d_{90}$ of 149.0 microns.

A silica binder was prepared as follows: 20 grams of sodium silicate was dispersed in 40 grams of water and then slowly added to 200 grams of a mixture of the diatomaceous earth feed material and the natural glass feed material in a Hobart food mixer. The same amount of sodium silicate solution was used for all the mixtures of diatomaceous earth feed material and the natural glass feed material with different ratios. After mixing in for 15 minutes, the mixture of sodium silicate solution, diatomaceous earth feed material, and natural glass feed material was brushed through a 16 mesh screen with 1.18 millimeter openings. The oversize particles were broken and forced through the screen by brushing. After drying in a 150° C. oven overnight, the material was brushed through a 30 mesh screen with 0.6 millimeter openings.

Example 1

In the first example, 150 grams of the commercially available diatomaceous earth (DE) was mixed with 50 grams of the commercially available perlite at a ratio of diatomaceous earth to perlite of 3:1. Thereafter, the sodium silicate solution was added to the mixture of diatomaceous earth and perlite for co-agglomeration. The co-agglomerated product was dried and classified via a screen, resulting in the dried and classified product having the following particle size distribution: a $d_{10}$ of 23.89 microns, a $d_{50}$ of 54.56 microns, and $d_{90}$ of 104.6 microns. The product of Example 1 was tested and exhibited a permeability of 9.93 darcys, and a wet density of 13.9 lbs/ft³, as shown in Table 1 below.

TABLE 1

| Examples | DE (%) | Perlite (%) | Permeability (Darcy) | Wet Density (lbs/ft3) | $d_{10}$ | $d_{50}$ | $d_{90}$ |
|---|---|---|---|---|---|---|---|
| DE (Hyflo) | | | 1.04 | 22.5 | 9.89 | 34.96 | 99.83 |
| Perlite (H905) | | | 2.39 | 12.5 | 18.93 | 56.37 | 149.0 |
| Example 1 | 75 | 25 | 9.93 | 13.9 | 23.89 | 54.56 | 104.6 |
| Example 2 | 50 | 50 | 10.49 | 13.7 | 25.74 | 57.75 | 106.9 |
| Example 3 | 25 | 75 | 15.80 | 11.3 | 27.78 | 62.43 | 111.8 |
| Example 4 | 75 | 25 | 1.20 | 18.1 | 12.61 | 43.73 | 133.9 |
| Example 5 | 50 | 50 | 1.55 | 17.8 | 15.25 | 50.11 | 147.4 |
| Example 6 | 25 | 75 | 2.15 | 12.5 | 17.07 | 53.63 | 146.2 |

Example 2

For Example 2, 100 grams of the commercially available diatomaceous earth (DE) was mixed with 100 grams of the commercially available perlite at a ratio of diatomaceous earth to perlite of 1:1. Thereafter, the sodium silicate solution was added to the mixture of diatomaceous earth and perlite for co-agglomeration. The co-agglomerated product was dried and classified via a screen, resulting in the dried and classified product having the following particle size distribution: a $d_{10}$ of 25.74 microns, a $d_{50}$ of 57.75 microns, and $d_{90}$ of 106.9 microns. The product of Example 2 was tested and exhibited a permeability of 10.49 darcys, and a wet density of 13.7 lbs/ft$^3$, as shown in Table 1.

Example 3

For Example 3, 50 grams of the commercially available diatomaceous earth (DE) was mixed with 150 grams of the commercially available perlite at the ratio of diatomaceous earth to perlite of 1:3. Thereafter, a sodium silicate solution was added to the mixture of diatomaceous earth and perlite for co-agglomeration. The co-agglomerated product was dried and classified via a screen, resulting in the dried and classified product having the following particle size distribution: a $d_{10}$ of 27.78 microns, a $d_{50}$ of 62.43 microns, and $d_{90}$ of 111.8 microns. The product of Example 3 was tested and exhibited a permeability of 15.80 darcys, and a wet density of 11.3 lbs/ft$^3$, as shown in Table 1.

For comparative Examples 4-6, the same commercially available diatomaceous earth and commercially available perlite feed materials used in Examples 1-3 were used as the feed materials. However, in Examples 4-6, rather than co-agglomerating the diatomaceous earth and perlite, the diatomaceous earth and perlite feed materials are blended without agglomeration as described below.

Comparative Example 4

For comparative Example 4, 75 grams of the commercially available diatomaceous earth was mixed with 25 grams of the commercially available perlite at a ratio of diatomaceous earth to perlite of 1:3, the same as for Example 1. The mixture of diatomaceous earth and perlite had the following particle size distribution: a $d_{10}$ of 12.61 microns, a $d_{50}$ of 43.73 microns, and $d_{90}$ of 133.9 microns. The product of comparative Example 4 was tested and exhibited a permeability of 1.20 darcys, and a wet density of 18.1 lbs/ft$^3$, as shown in Table 1. As compared to Example 1, the permeability is much lower, and the wet and alpha densities are higher.

Comparative Example 5

For comparative Example 5, 50 grams of the commercially available diatomaceous earth was mixed with 50 grams of the commercially available perlite at a ratio of diatomaceous earth to perlite of 1:1, the same as for Example 2. The mixture of diatomaceous earth and perlite had the following particle size distribution: a $d_{10}$ of 15.25 microns, a $d_{50}$ of 50.11 microns, and $d_{90}$ of 147.4 microns. The product of comparative Example 5 was tested and exhibited a permeability of 1.55 darcys, and a wet density of 17.8 lbs/ft$^3$, as shown in Table 1. As compared to Example 2, the permeability is much lower, and the wet and alpha densities are higher.

Comparative Example 6

For comparative Example 6, 25 grams of the commercially available diatomaceous earth was mixed with 75 grams of the commercially available perlite at a ratio of diatomaceous earth to perlite of 1:3, the same as for Example 3. The mixture of diatomaceous earth and perlite had the following particle size distribution: a $d_{10}$ of 17.07 microns, a $d_{50}$ of 53.63 microns, and $d_{90}$ of 146.2 microns. The product of comparative Example 6 was tested and exhibited a permeability of 2.15 darcys, and a wet density of 12.5 lbs/ft$^3$, as shown in Table 1. As compared to Example 3, the permeability is much lower, and the wet densities are higher.

Example 7

Example 1 was repeated except calcined DE Standard Super-Cel was used instead of flux calcined DE Hyflo. The dried and classified product having the following particle size distribution: a $d_{10}$ of 13.47 microns, a $d_{50}$ of 35.40 microns, and $d_{90}$ of 87.26 microns, a permeability of 2.39 darcys, a wet density of 15.0 lbs/ft$^3$, as shown in Table 2 below.

TABLE 2

| Examples | DE (%) | Perlite (%) | Permeability (Darcy) | Wet Density (lbs/ft3) | $d_{10}$ | $d_{50}$ | $d_{90}$ |
| --- | --- | --- | --- | --- | --- | --- | --- |
| DE (SSC) | | | 0.29 | 18.4 | 7.07 | 24.11 | 69.63 |
| Perlite (H905) | | | 2.39 | 12.5 | 18.93 | 56.37 | 149.0 |
| Example 7 | 75 | 25 | 2.39 | 15.0 | 13.47 | 35.40 | 87.26 |
| Example 8 | 50 | 50 | 4.58 | 13.7 | 17.68 | 44.54 | 96.73 |
| Example 9 | 25 | 75 | 9.44 | 11.0 | 23.06 | 55.58 | 106.9 |
| Example 10 | 75 | 25 | 0.35 | 17.6 | 9.83 | 35.01 | 91.77 |
| Example 11 | 50 | 50 | 0.58 | 16.0 | 13.03 | 42.64 | 96.52 |
| Example 12 | 25 | 75 | 1.13 | 13.5 | 15.53 | 47.30 | 100.4 |

Example 8

Example 2 was repeated except calcined DE Standard Super-Cel was used instead of flux calcined DE Hyflo. The dried and classified product having the following particle size distribution: a $d_{10}$ of 17.68 microns, a $d_{50}$ of 44.54 microns, and $d_{90}$ of 96.73 microns, a permeability of 4.58 darcys, a wet density of 13.7 lbs/ft$^3$.

Example 9

Example 3 was repeated except calcined DE Standard Super-Cel was used instead of flux calcined DE Hyflo. The dried and classified product having the following particle size distribution: a $d_{10}$ of 23.06 microns, a $d_{50}$ of 55.58 microns, and $d_{90}$ of 106.9 microns, a permeability of 9.44 darcys, a wet density of 11.0 lbs/ft$^3$.

Comparative Example 10

Comparative Example 4 was repeated except calcined DE Standard Super-Cel was used instead of flux calcined DE Hyflo. The dried and classified product having the following particle size distribution: a $d_{10}$ of 9.83 microns, a $d_{50}$ of 35.01 microns, and $d_{90}$ of 91.77 microns, a permeability of 0.35 darcys, a wet density of 17.6 lbs/ft$^3$. As compared to Example 7, the permeability is much lower, and the wet and alpha densities are higher.

Comparative Example 11

Comparative Example 5 was repeated except calcined DE Standard Super-Cel was used instead of flux calcined DE Hyflo. The dried and classified product having the following particle size distribution: a $d_{10}$ of 13.03 microns, a $d_{50}$ of 42.64 microns, and $d_{90}$ of 96.52 microns, a permeability of 0.58 darcys, a wet density of 16.0 lbs/ft$^3$. As compared to Example 8, the permeability is much lower, and the wet and alpha densities are higher.

Comparative Example 12

Comparative Example 5 was repeated except calcined DE Standard Super-Cel was used instead of flux calcined DE Hyflo. The dried and classified product having the following particle size distribution: a $d_{10}$ of 15.53 microns, a $d_{50}$ of 47.30 microns, and $d_{90}$ of 100.4 microns, a permeability of 1.13 darcys, a wet density of 13.5 lbs/ft$^3$. As compared to Example 9, the permeability is much lower, and the wet and alpha densities are higher.

A comparison of Examples 1-3, 7-9, and Comparative Examples 4-6 and 10-12, shows that the diatomaceous earth and perlite co-agglomerated with sodium silica solution have significantly higher permeabilities than the respective comparative examples having the same diatomaceous earth and perlite combined at the same ratios. While not wishing to be bound by theory, it is believed that the fine diatomaceous earth and perlite particles are bonded to one another to form the co-agglomerated composite material. This appears to be confirmed by the scanning electron micrograph of the co-agglomerated diatomaceous earth and perlite shown in FIG. 1.

Figure 2:
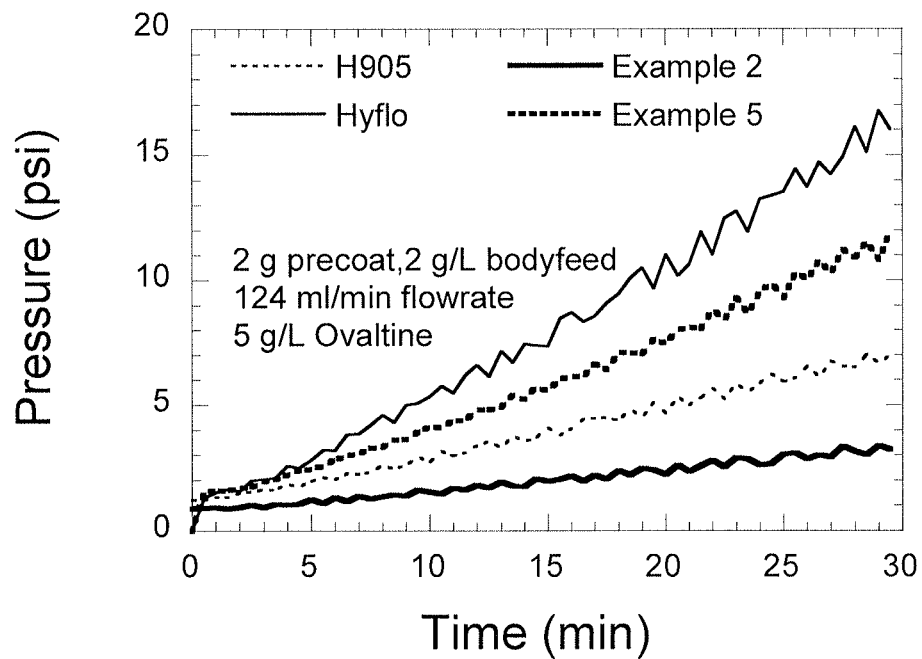
FIG. 2 is a graph depicting pressure versus filtration time for four exemplary filter aids.
Figure 3:
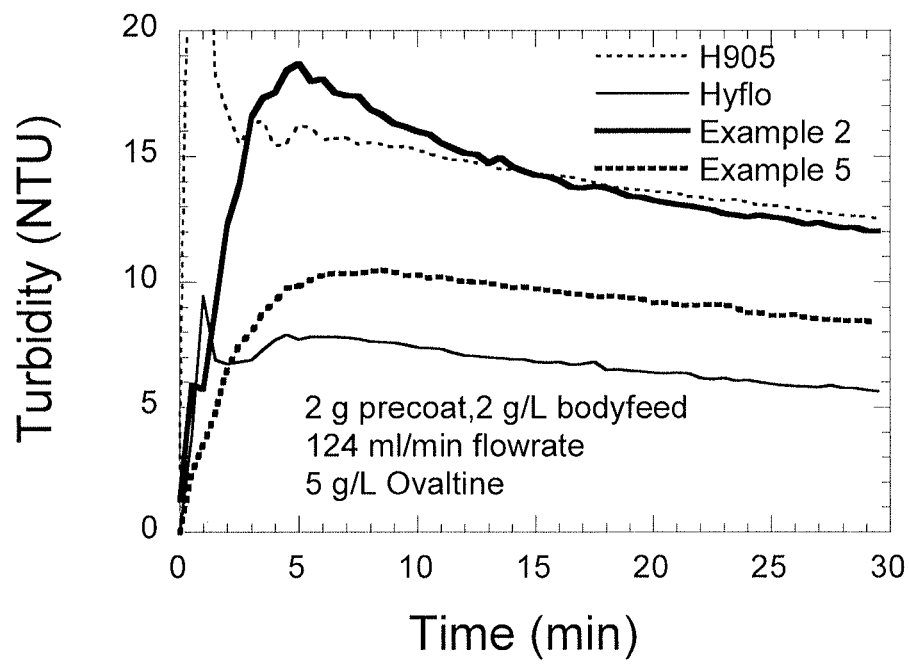
FIG. 3 is a graph depicting turbidity versus filtration time for the four exemplary filter aids shown in FIG. 2.

In addition, FIGS. 2 and 3 are graphs depicting pressure versus filtration time and turbidity versus filtration time, respectively, for four exemplary filter aids. As shown in FIG. 2, the filter aid of commercially available diatomaceous earth (DE) resulted in the highest pressure. The filter aid resulting in the next highest pressure was the filter aid formed of a blend (un-agglomerated) of the DE and perlite (Example 5). The filter aid formed from the perlite resulted in the third highest pressure. As shown in FIG. 2, the filter aid formed from a co-agglomeration of the DE and perlite (Example 2) resulted in the lowest pressure. The commercially available DE and commercially available perlite were the same for all four filter aids. End pressure for the co-agglomerated DE and perlite sample is about 73% lower than the DE and perlite blend sample (un-agglomerated).

As shown in FIG. 3, turbidity versus time for the four filter aids depicted in FIG. 2, the commercially available perlite H905 has the highest turbidity. The co-agglomerated DE and perlite is similar to commercially available perlite H905. However, the end pressure for the co-agglomerated DE and perlite is about 54% lower than the commercially available perlite H905. Thus, the filter aid formed from the co-agglomerated DE and perlite resulted in the lowest pressure in combination with similar turbidity to the commercially available perlite.

Other physical properties of the co-agglomerated DE and perlite products are listed in Table 3 below.

TABLE 3

| Examples | Cristobalite (%) | BSI (ppm) | Pore Volume (L/mg) | Median Pore Size (um) |
|---|---|---|---|---|
| Hyflo | 25.82 | 27.80 | 4.1021 | 16.2404 |
| H905 | ND | 2.82 | 7.6587 | 33.4895 |
| SSC | 1.34 | 22.50 | 3.1620 | 4.7089 |
| Example 1 | 18.29 | 0.09 | 4.8692 | 23.9121 |
| Example 2 | 12.05 | 0.47 | 5.4988 | 26.0711 |
| Example 3 | 5.74 | 0.28 | 6.4310 | 31.4854 |
| Example 7 | 0.75 | 3.29 | 5.2536 | 10.1237 |
| Example 8 | 0.67 | 1.97 | 5.6571 | 15.5336 |
| Example 9 | 0.42 | ND | 6.6171 | 23.5845 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composite filter aid comprising co-agglomerated particles that comprise:
   diatomaceous earth;
   natural glass; and
   1% to 5% by weight of an alkali silicate binder, with respect to the total weight of the co-agglomerated particles;
   wherein the average particle size of the diatomaceous earth ranges from 5 microns to 200 microns; and
   wherein the average particle size of the natural glass ranges from 5 microns to 200 microns.

2. The composite filter aid of claim 1, wherein the filter aid has a permeability ranging from 5 darcys to 16 darcys.

3. The composite filter aid of claim 1, wherein the filter aid has a permeability ranging from 15 darcys to 20 darcys.

4. The composite filter aid of claim 1, wherein the diatomaceous earth comprises calcined diatomaceous earth, flux calcined diatomaceous earth, or a mixture thereof.

5. The composite filter aid of claim 1, wherein the natural glass comprises at least one of perlite, volcanic ash, pumice, shirasu, obsidian, pitchstone, or rice hull ash.

6. The composite filter aid of claim 1, wherein the co-agglomerated particles have a $d_{50}$ diameter ranging from 30 microns to 70 microns.

7. The composite filter aid of claim 1, wherein the co-agglomerated particles have a $d_{90}$ diameter ranging from 80 microns to 120 microns.

8. The composite filter aid of claim 1, wherein the filter aid has a ratio of the diatomaceous earth to the natural glass ranging from 1:3 to 3:1 by weight.

9. The composite filter aid of claim 1, wherein the filter aid has a BET surface area ranging from 5 $m^2/g$ to about 50 $m^2/g$.

10. The composite filter aid of claim 1, wherein the diatomaceous earth has a median pore size ranging from 5 microns to 35 microns.

11. The composite filter aid of claim 1, wherein the diatomaceous earth has a surface area ranging from 5 $m^2/g$ to 40 $m^2/g$.

12. The composite filter aid of claim 1, wherein the filter aid has a porosity ranging from 3 liters per milligram to 7 liters per milligram.

13. The composite filter aid of claim 1, wherein the filter aid has a beer soluble iron content of less than 5 ppm, as measured by the American Society of Brewing Chemists (ASBC) method.

14. The composite filter aid of claim 1, wherein the filter aid has a beer soluble iron content of less than 1 ppm, as measured by the ASBC method.

15. The composite filter aid of claim 1, wherein the filter aid has a cristobalite content of less than 6% by weight.

16. The composite filter aid of claim 1, wherein the filter aid has a cristobalite content of less than 1% by weight.

17. The composite filter aid of claim 1, wherein the filter aid has an alpha density ranging from 9 $lbs/ft^3$ to 15 $lbs/ft^3$.

18. The composite filter aid of claim 1, wherein the filter aid has a permeability ranging from 2 darcys to 20 darcys.

19. A composite filter aid comprising co-agglomerated particles that comprise:
   diatomaceous earth having a $d_{50}$ diameter ranging from 20 microns to 70 microns;
   perlite having a $d_{50}$ diameter ranging from 15 microns to 80 microns; and an alkali silicate binder;
   wherein the co-agglomerated particles have a $d_{50}$ diameter ranging from 30 microns to 70 microns;
   wherein the filter aid has a wet density of less than 15 $lbs/ft^3$; and
   wherein the average particle size of the diatomaceous earth ranges from 5 microns to 200 microns; and
   wherein the average particle size of the perlite ranges from 5 microns to 200 microns.

20. A method for making a co-agglomerated material, the method comprising:
   blending diatomaceous earth and perlite in a weight ratio of diatomaceous earth to perlite of 1:3 to 3:1;
   adding alkali silicate to the blended diatomaceous earth and perlite;
   precipitating the alkali silicate as a binder that binds the diatomaceous earth and the perlite together to make the co-agglomerated material; and
   wherein the average particle size of the diatomaceous earth ranges from 5 microns to 200 microns; and
   wherein the average particle size of the perlite ranges from 5 microns to 200 microns.

21. The method of claim 20, wherein the weight ratio of diatomaceous earth to perlite is 1:3.

* * * * *